May 20, 1947.　　　H. J. FOWLER　　　2,420,874
CLOCK-ACTUATED ELECTRIC CONTROL MEANS
Filed July 10, 1944　　　6 Sheets-Sheet 1
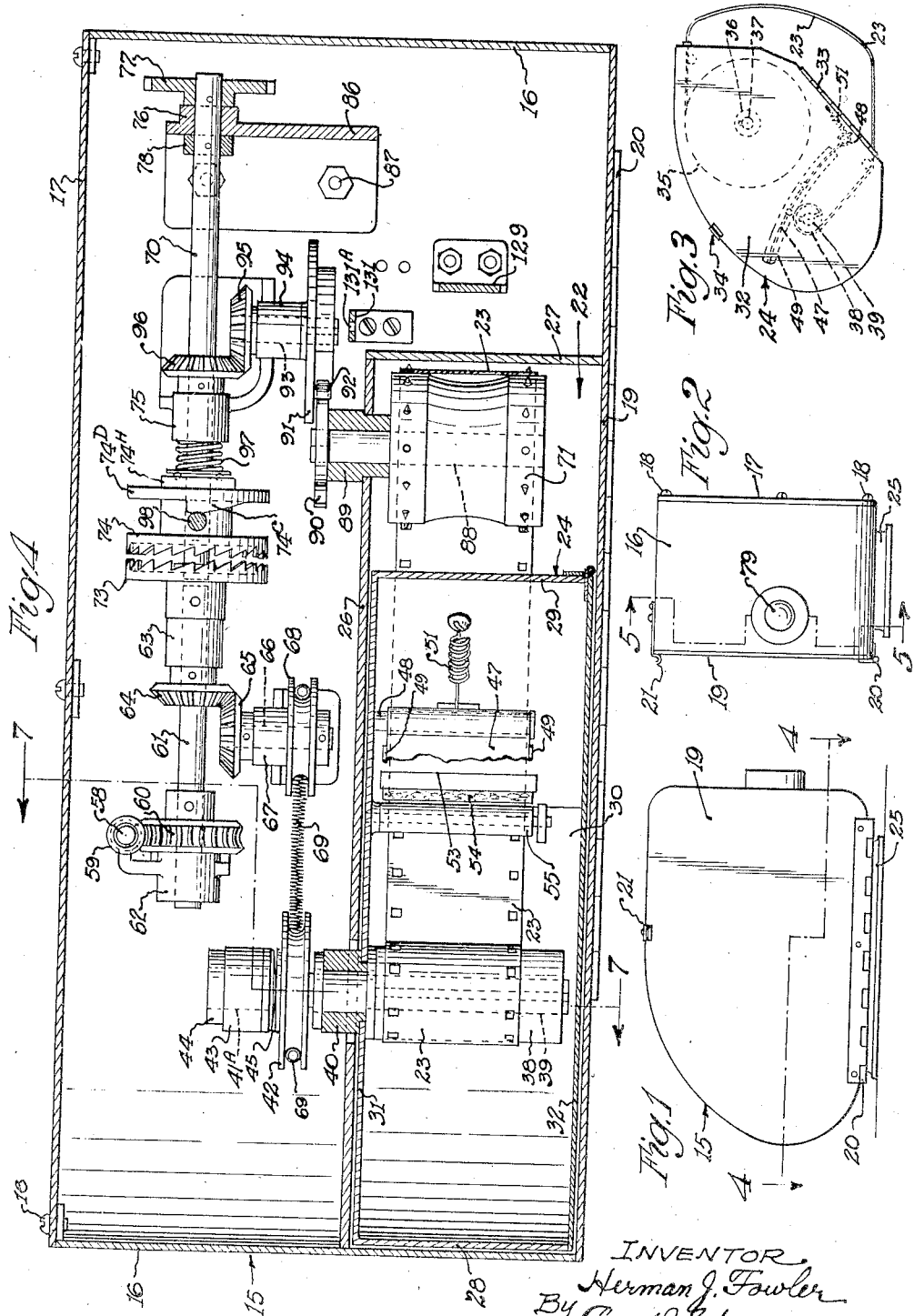

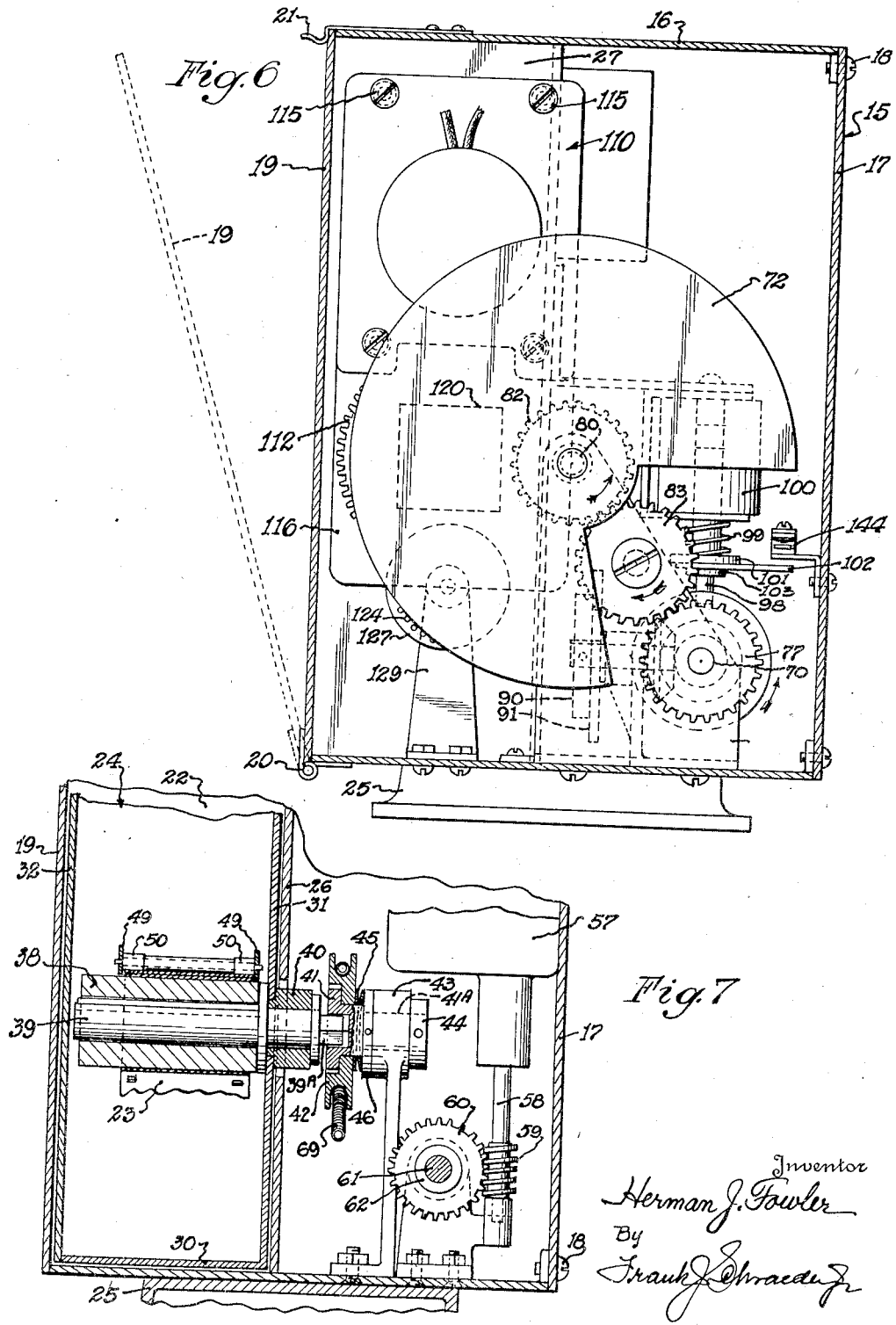

May 20, 1947.  H. J. FOWLER  2,420,874
CLOCK-ACTUATED ELECTRIC CONTROL MEANS
Filed July 10, 1944  6 Sheets-Sheet 5

Inventor
Herman J. Fowler
by Frank J. Schraeder Jr.
Attorneys.

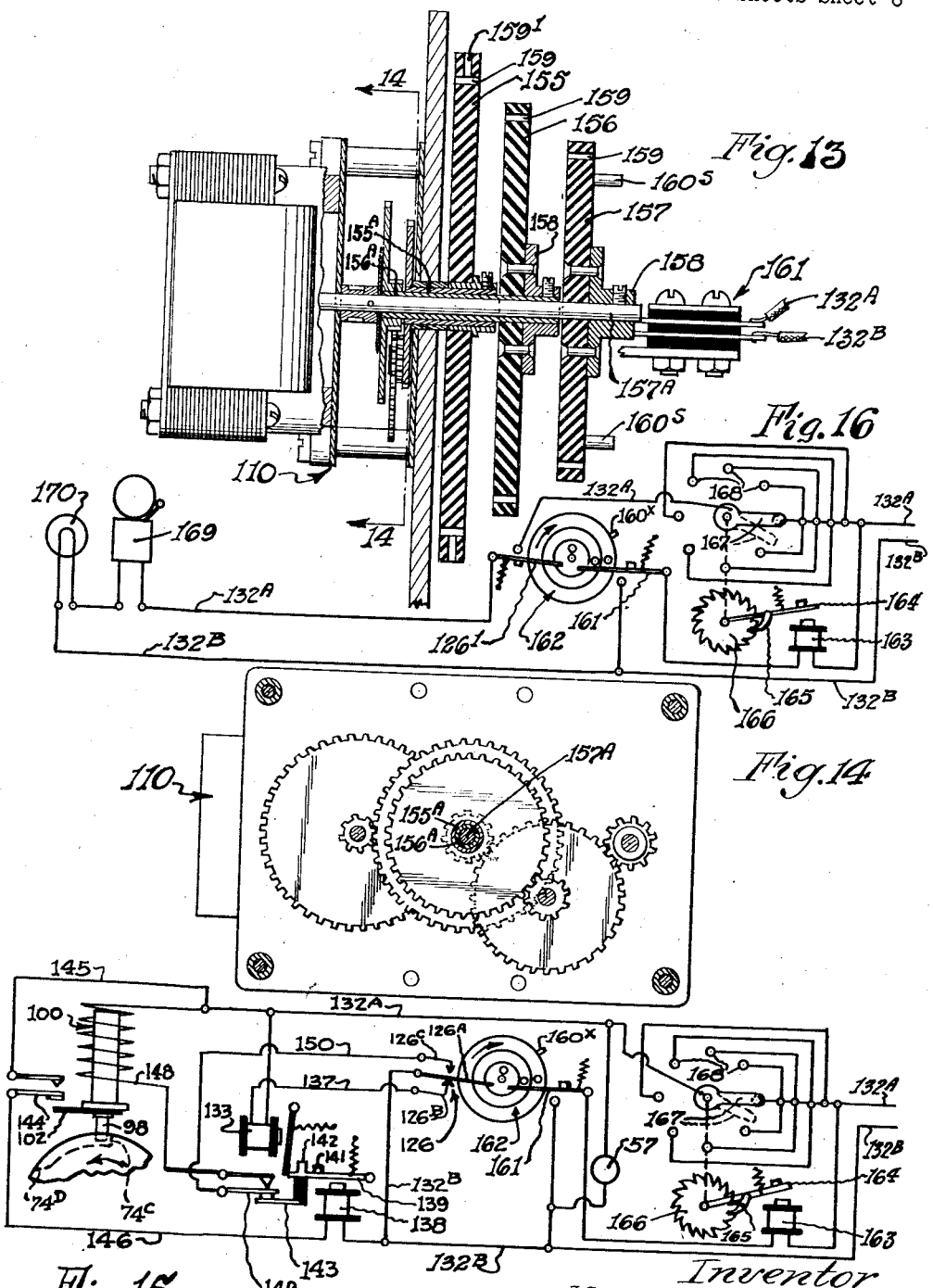

Patented May 20, 1947

2,420,874

UNITED STATES PATENT OFFICE 2,420,874

CLOCK-ACTUATED ELECTRIC CONTROL MEANS

Herman J. Fowler, Chicago, Ill.

Application July 10, 1944, Serial No. 544,160

5 Claims. (Cl. 161—1)

This invention relates to clock-actuated electric control means. One adaptation or exemplification of my invention is herein disclosed in its application to photographic apparatus for making periodic time-recorded exposures. More particularly, my invention is shown herein as applied to and has among its objects to provide an automatically operated time-controlled electric switch for controlling electrical apparatus, such as for example, photographic apparatus for automatically periodically making a series of photographic exposures on a sensitive film and simultaneously recording on the film, in connection with each exposure, the time at which each such exposure was made.

The photographic apparatus and its construction and operation are fully disclosed and described in Patent No. 2,353,154 which issued to me on July 11, 1944. The control apparatus of this application is divided from the application which matured into said patent and is claimed herein in conjunction with additional improved features of control.

Thus this application is in part a continuation of that which matured into the said patent.

Other apparatus, devices, and machines may be time-controlled by my invention. Such other uses and adaptations will become readily apparent to those skilled in the art to which my invention relates upon perusal of the attached drawings and the following specifications.

My invention is readily applicable for periodically closing or opening an electric circuit for controlling the starting, stopping and periodic operation of an apparatus, device or machine and for controlling the periodic operations of electrical systems and apparatus and devices and various mechanical devices, machines and processes, such as, for example, signal and alarm systems, solenoid controlled devices or circuits, heating processes, mixing processes, baking ovens, and chemical processes.

Another feature of my invention resides in the provision of improved adjustable means for selectively varying the operative or inoperative time periods of various electrical control circuits or mechanisms; such periods being relatively varied or uniform periods of time.

Other novel features of the invention reside in the novel time-controlled mechanism employed in automatically opening or closing an electric circuit and time-controlling the period during which the circuit is open or closed.

With the above and other objects in view, which will become readily apparent from the perusal of the attached drawings in which I illustrate certain exemplifications of my invention, my invention comprises novel features of construction, combination of elements and arrangement of parts shown in preferred embodiments and exemplifications in the attached drawings, described in the following specification and particularly pointed out in the appended claims.

In the drawings, in which like reference numerals designate like or corresponding members or parts, Fig. 1 is a side view of photographic apparatus embodying my clock-actuated electric control invention and shown in reduced scale;

Fig. 2 is a front view of the apparatus;

Fig. 3 is a side view of the film magazine;

Fig. 4 is an enlarged horizontal section taken on line 4—4 of Fig. 1 showing the main drive shaft, film magazine and film drive mechanism;

Fig. 6 is a vertical section taken on line 6—6 of Fig. 5 showing the shutter, shutter drive, main drive shaft and clutch operating solenoid;

Fig. 7 is a vertical section taken on line 7—7 of Fig. 4 showing portions of the electric drive motor, main drive shaft, the film tension and take-up and the film-centering means for guiding the exposed film portion during winding onto its receiving spool;

Fig. 13 is a vertical section taken on line 13—13 of Fig. 12;

Fig. 14 is a vertical section taken on line 14—14 of Fig. 13;

Fig. 15 illustrates a modification of the circuit shown in Fig. 10 whereby the master switch is time-controlled; and Fig. 16 illustrates an application of my invention to a time-controlled circuit in an alarm system.

Figure 5:
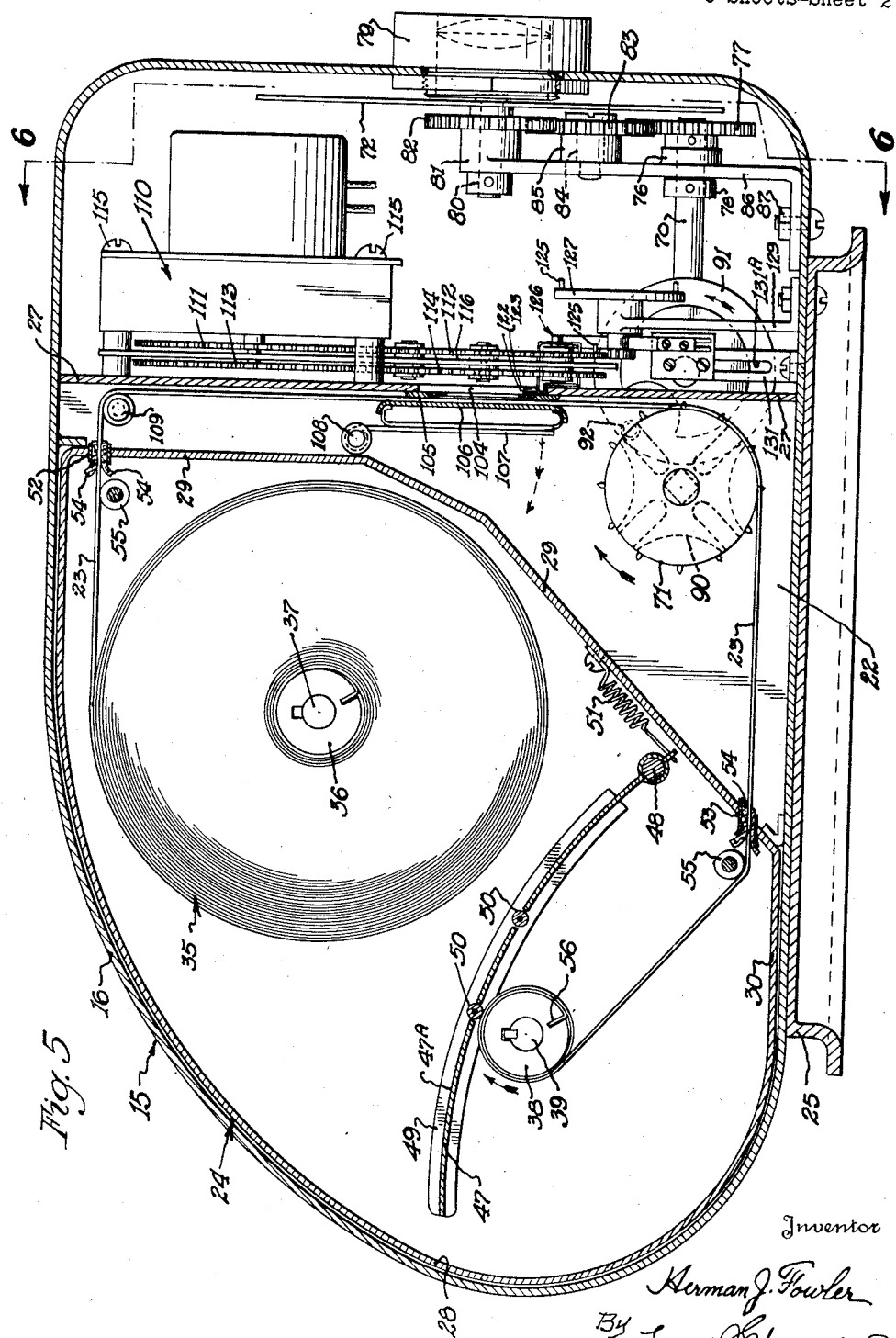
Fig. 5 is a vertical section taken on line 5—5 of Fig. 2 showing the film magazine, film drive mechanism, electric clock, shutter and shutter-operating mechanism.

As shown in Figs. 1 to 10 inclusive of the attached drawings, my improved clock-actuated electric control means is shown as applied to photographic apparatus comprising a housing 15 consisting of a central plate portion 16 forming the combined rear, top, front and bottom wall, a side wall closure plate 17, connected by screws 18 to the wall plate 16, and a closure cover plate 19 hingedly connected, by hinge 20, to the bottom portion of the wall plate 16 and held in closed position by a suitable spring latch 21.

The housing 16 is mounted on a suitable base 25.

As more clearly shown in Figs. 4 to 7 inclusive, I provide, within the housing 15, a separate compartment 22 for the film 23 and film magazine 24.

The compartment 22 is defined by the enclosing walls 26 and 27 and is closed by the housing cover 19.

As more clearly shown in Figs. 3 and 4, the magazine wall portions 28, 29 and 30 are provided with a side closure wall 31 and a cover 32 which is hingedly connected to the front wall portion 29 as at 33. The cover 32 is held in closed position by any suitable latch 34 similar, for example, to the latch 21 for the housing cover 19.

The unexposed film reel 35 is provided with the film-feeding spool 36 slidably mounted on and keyed to spindle 37, and the film-receiving spool 38 is slidably mounted on and keyed to the spindle 39 and both spindles 37 and 39 are rotatably supported in bearings 40 secured in openings within the magazine side wall 31.

The film-receiving spool spindle 39 is provided with an extension 39A of square cross-section for engagement within a square opening in the flanged central hub member 41 of the friction clutch sheave 42 which is rotatably supported on the flanged central member 41.

The flanged central hub member 41 is formed with an integral stub shaft 41A which is rotatably supported in the upstanding bracket bearing 43 and held against longitudinal displacement by a set screw collar 44.

Between the sheave 42 and the bearing 43 is a plurality of resilient dished washers 45 and a flat faced adjustment washer 46, set-screwed to the stub shaft 41A, the washer 46 is adapted to be adjusted to cause the resilient washers 45 to press the sheave 42 into frictional engagement with the flange of the central hub member 41 to cause the hub member 41 and the spindle 39 and its receiving spool 38 to rotate with the sheave 42. Such frictional drive permits the driving of the film-receiving spool at variable speeds conforming to the growing diameter of the film reeled thereon and always insuring sufficient tension upon the film fed thereto.

The film-protecting and guiding means mounted within the magazine 24 consists of an arcuate plate 47 finished with a highly polished face 47A and pivotally mounted on the pivot pin 48.

The plate 47 is centrally disposed between a pair of arcuate side arms 49 spaced to guide the intermarginal edges of the film therebetween. Intermediate the upper and lower ends of the plate 47, and intersecting the plate 47, I provide at least two sets of spaced rollers 50, one or the other of which sets of rollers is adapted to continuously ride on the marginal portions of the film as it is wound upon the receiving spool 38 to thereby guide and slightly press the film during its winding movement. The desired slight pressure is attained by means of a very light coil spring 51 having one end anchored to the plate 47 and its opposite end secured to the casing wall 29.

The film reel 35 is positioned as shown in Fig. 5 with the film leading end extended through slit apertures 52 and 53, made proof against leakage of light by felt pads 54, and trained about rollers 55 with its end secured in the slot 56 of the film-receiving spool 38.

The driving mechanism includes a constant speed electric motor 57 having a shaft 58 provided with a worm pinion 59 operatively in mesh with the worm gear 60 keyed to the main drive shaft 61.

The main drive shaft 61 is supported in spaced bearings 62 and 63 and has secured thereto a bevel gear 64 which is in mesh with the bevel gear 65 secured to a stub shaft 66 carried in the bearing 67.

A sheave 68 is secured to the stub shaft 66 and this sheave 68 by means of the belt 69, trained about it and the sheave 42, imparts constant rotary motion, through its frictional engagement with its separate hub member 41 and spindle 39, to the film-receiving spool 38.

The constantly rotating main drive shaft 61 also intermittently imparts rotary motion to the intermittently operable driven shaft 70 which is employed to cause intermittent rotations of the film-propelling drum sprocket 71 and the shutter 72, and these intermittent operations are attained by an intermittently actuable clutch of suitable design.

The shafts 61 and 70 are end aligned and, as shown in Fig. 4, are provided with complementary friction clutch elements 73 and 74 which are shown as of the serrated face type. The clutch element 73 is secured to one end of shaft 61 and the other clutch element 74 is slidably mounted on and keyed to one end of the intermittently operable driven shaft 70.

The intermittently operable film and shutter drive shaft 70 is supported in the spaced bearings 75 and 76. The main shutter drive gear 77 is secured to the outer end of shaft 70 and a set collar 78 may be added thereon adjacent the bearing 76 to retain the shaft 70 against longitudinal shifting movement.

The front of the casing wall 16 is provided with suitable photographic lens 79 centered for alignment with the longitudinal center-line of the film 23.

The disk shutter 72 is secured to a stub shaft 80 which is carried in bearing 81 and the shaft 80 and shutter 72 are rotated by the shutter drive gear 82 which is also secured to shaft 80. The shutter drive gear 82 is driven by the main shutter drive gear 77 through an intermediate drive gear 83 which is mounted on the stub shaft 84 carried in the bearing 85. As shown in Figs. 5 and 6, the bearings 76, 81 and 85 are shown integral with their common supporting bracket 86 which is suitably secured by bolts 87 to the bottom of the housing 15.

The film-propelling sprocket 71 and the shutter 72 are both driven by the intermittently rotatable driven shaft 70. The sprocket 71 has two sets of circumferentially spaced teeth adapted to interengage with spaced marginal rows of film perforations to thereby propel the film 23.

The sprocket 71 is fixed to shaft 88 which is carried in the bearing 89 supported in the wall 26. The shaft 88 is provided with a square end to receive thereon the Maltese cross element 90 of the well known Geneva movement which includes the disk operator 91 with a roller 92 thereon.

The Geneva disk operator 91 is secured to shaft 93 which is carried in the bearing 94.

The Geneva movement is arranged to intermittently rotate the film drive sprocket 71 through rotary motion of the shaft 93 by means of the bevel gear 95 which is fixed thereto and in mesh with the bevel gear 96 fixed to shaft 70.

The intermittent operation of the shaft 70 is attained through the clutch parts 73 and 74. As shown in Fig. 4 these clutch parts or elements are in disengaged position.

The clutch element 74 includes a cam disk 74D having a cam 74C and this cam disk is made an integral part of the clutch element 74 by the connecting hub 74H. A coil spring 97 mounted about shaft 70, between the hub 74H of the clutch element 74 and the bearing 75, tends to move the clutch element 74 into operative engagement with its cooperating clutch element 73. As shown in Fig. 4, the element 74 is restrained in inoperative position or disengaged from element 73 after having been shifted, against the pressure of spring 97, from its frictional clutching engagement with element 73 by the engagement of its cam 74C with the plunger 98 of the solenoid 100.

When the solenoid 100 is deenergized its plunger 98 is in its lowermost or dropped position as shown in Fig. 4, and to insure the movement of the solenoid plunger 98, into such lowered or de-clutched position, I interpose a light coil spring 99 between the solenoid 100 and a disk collar 101 which is secured to the plunger 98.

The solenoid plunger 98 also carries a switch-operating arm 102 which is secured to the plunger 98 between the collar 101 and the collar 103 also secured to the plunger 98.

The front wall 27 of the film compartment 22 is provided with an aperture 104 which is aligned with the axis of the lens 79 and this aperture is preferably provided with a frame 105 over which the film 23 rides while retained by the film-pressure plate 106 supported on the depending leaf spring 107 pivotally supported at 108; the exposed loop portion of the film lead being trained over the over-head corner rollers 109, between the film-pressure plate 106 and the aperture frame 105 and around the driving sprocket 71.

My improved clock-actuated control means is exemplified in its application to the time-recording mechanism which includes a suitable clock 110, preferably an electric clock, which is provided with a minute-hand operating gear 111 and an hour-hand operating gear 113.

The clock 110 is secured to the film-compartment front wall 27, as by screws 115, and carries a depending supporting plate 116 which is provided with a circular opening 117 centralized with the center of the aperture 104.

The supporting plate 116 functions to support the time-recording minute-hand-carrying-gear 112, which is in operative mesh with the clock minute-hand operating gear 111, and the time-recording hour-hand-carrying-gear 114 which is in operative mesh with the clock hour-hand operating gear 114.

Figure 8:
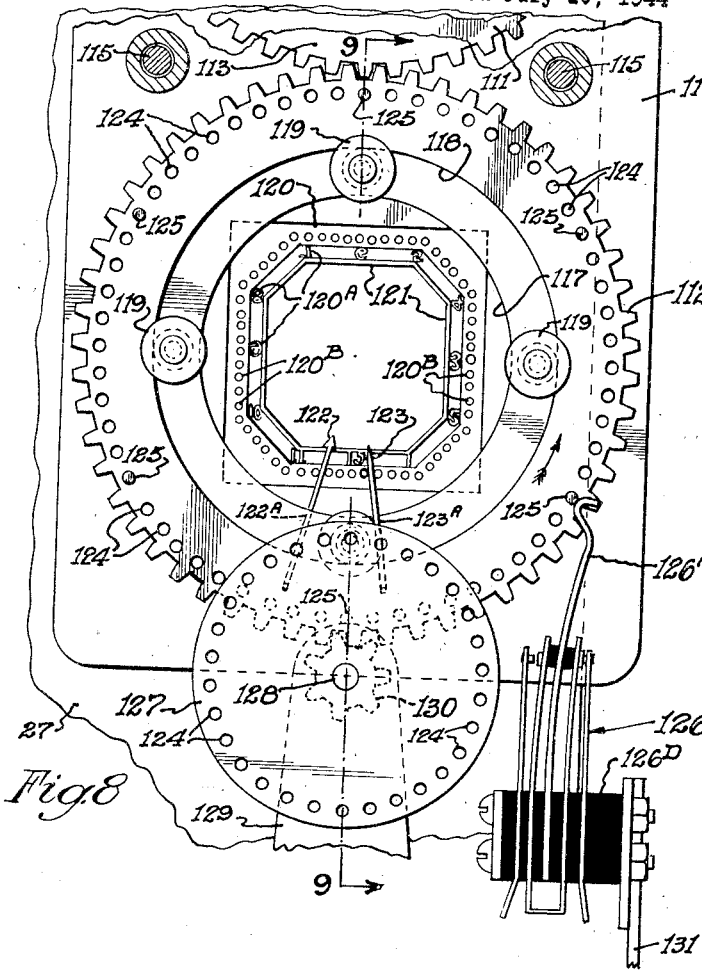
Fig. 8 is an enlarged front view of the time recording means and the adjustable clock-actuated electric control means for periodically controlling the recording of the time on each film exposure.
Figure 9:
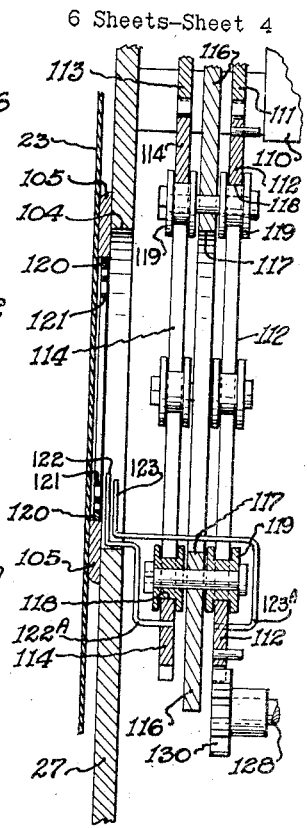
Fig. 9 is a vertical section through the clock-actuated electric control means taken on line 9—9 of Fig. 8.

As shown more clearly in Figs. 5, 8 and 9, the minute and hour hand-carrying-gears 112 and 114 consist of ring gears having outer circular toothed faces and plain inner circular faces 118 which are rotatably supported on a plurality of circumferentially spaced pairs of rollers 119 supported on bolts or the like which are securely mounted on the supporting plate 116.

The aperture frame 105 carries an inserted plate 120 of very thin metal representing a clock dial and is provided with a central opening 121 through which the photographic image is projected onto the film. The area surrounding the opening 121 is provided with suitable perforations representing hour-indicating numerals 120A and spaced circular perforations representing minute indications 120B.

Cooperating with the hour and minute indications of the clock dial are an hour-indicating hand 122 and a minute-indicating hand 123.

The hour hand 122 is provided with a bent integral extension 122A for securing it to gear 114 and the minute hand 123 is provided with a bent integral extension 123A for securing it to the gear 112.

Obviously every exposure on the film 23 made through the clock dial 120 will receive thereon a photographic silhouette of the clock dial together with silhouettes of the hour and minute hands thereby indicating the time at which such exposure was made. The photographed image recorded on the film will appear within the area defined by the aperture 121 of the clock dial.

The minute-hand gear 112 is provided with sixty equally spaced perforations 124 representing sixty minute spaces and the perforations 124 are adapted to receive therein switch-operating pins 125.

The pins 125 are adapted to operate the main control switch 126 by their periodic engagement with the switch arm 126A and thus adjustably, selectively and intermittently record a series of photographic exposures on successive portions of the film 23.

Since the minute-hand gear 112 makes one revolution each hour, the spaced perforations 124 move into successive positions each minute of time.

As shown in Figs. 8 and 9 for illustrative purposes, six pins 125 are inserted in equally spaced openings 124 to thereby successively operate the control switch 126 every ten minutes.

Obviously, successive film exposures could be made at the rate of one every hour by inserting only one of the pins 125 in one of the perforations 124, or if twelve equally spaced pins were inserted an exposure would be made every five minutes, and if all sixty pins were inserted one exposure would be made every minute.

In the event more rapid or frequent film exposures are desired, I provide an auxiliary switch-operating disc wheel 127 which is secured to one end of shaft 128 mounted in the bearing of an upstanding bracket 129. The other end of shaft 128 has secured thereto a small gear 130 which is operatively in mesh with the minute-hand gear 112.

The disc wheel 127 is provided with a plurality of equally spaced perforations or openings 124 adapted to receive one or more of the control switch operating pins 125.

As shown in Figs. 8 and 9, the ratio between the number of gear teeth on the minute-hand gear 112 and those on the small gear 130 is 8 to 1, hence, the disc wheel 127 will make eight revolutions each hour or one complete revolution every seven and one-half minutes. If thirty pins 125 were inserted in all of the thirty perforations in the disc wheel 127 then one film exposure would be made every fifteen seconds.

It will be understood that to secure such rapid successive exposures the switch 126 would necessarily have to be moved into operative position for actuation by the pins of the disc wheel 127 and this is possible simply by moving the upstanding bracket 131, on which the switch 126 is adjustably mounted, into position for operative engagement by the pins 124 in the disc wheel 127.

The control switch 126 is vertically adjustably supported on its block 126D in an elongated bolt opening 131A of the bracket 131 so that when the bracket 131 is moved to register the switch-operating arm 126ᴬ in register with the pins 125 of the disc wheel 127 it may also readily be lowered into proper operative position.

The operation of my improved clock-actuated electric control may be more readily understood from a description of the operation of the electrical system in conjunction with the mechanical elements controlled thereby.

Figure 10:
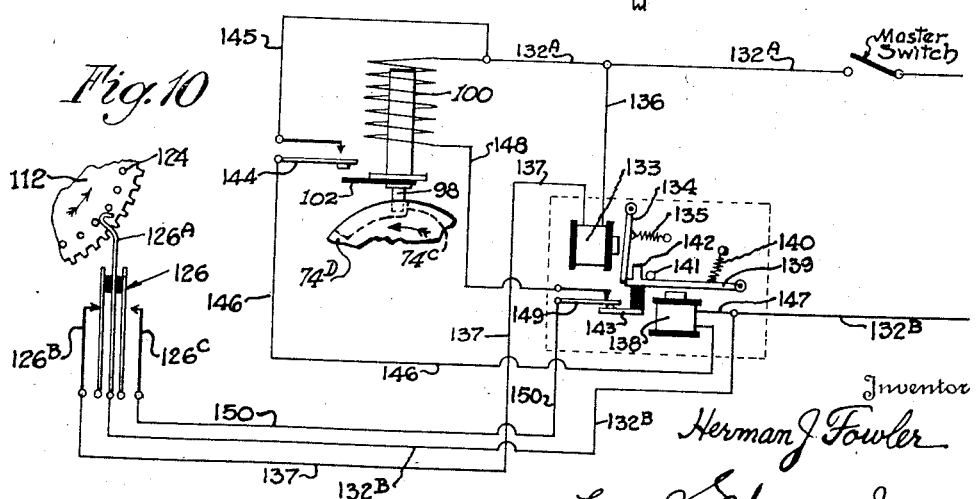
Fig. 10 is a diagrammatic illustration of the electrical system for controlling the periodic operation of the shutter and the periodic movement of the film.

As shown in Fig. 10, the electrical system includes the current supply lines 132ᴬ and 132ᴮ.

The locking relay electromagnet 133 is connected at one post with the power line 132ᴬ by a conductor 136. A conductor 137 connects the other post of the electromagnet 133 with the switch arm 126ᴮ of the main control switch 126 which has a central operating arm 126ᴬ connected to the power line 132ᴮ.

The locking relay includes an armature 134 which is adapted to be released into open position by a spring 135.

The circuit for the locking relay comprises the power line 132ᴬ, conductors 136 and 137, main control switch arms 126ᴮ and 126ᴬ and the power line 132ᴮ.

The electrical system also includes a resetting relay comprising an electromagnet 138, armature 139, a spring 140 to release the armature 139 into open position, a stop 141 for the armature 132, a stop 142 for the armature 134 carried on the armature 139, and an insulated switch-operating arm 143 carried on the armature 139.

The circuit for the resetting relay includes a normally open switch 144 which is adapted to be periodically closed by the switch-operating arm 102 carried on the solenoid plunger 98. This resetting relay operating switch 144 is connected at one post by a conductor 145 with the power line 132ᴬ and at its other post by another conductor 146 which is connected at its other end with one end of the armature 138, the other end of the armature 138 is connected by the conductor 147 to the power line 132ᴮ.

The circuit for the solenoid 100 includes its connection at one post with the power line 132ᴬ, a conductor 148 connecting the other post of the solenoid with one post of the solenoid-operating switch 149.

The other post of the solenoid-operating switch 149 being connected by the conductor 150 to the main control switch arm 126ᶜ.

The normally open solenoid switch 149 is adapted to be periodically closed by arm 143 of the resetting relay.

As shown in Fig. 10 the circuits of the electrical system show the locking relay in energized condition in which the cooperating mechanical elements are maintained positioned as illustrated in Figs. 4, 5, 6 and 7 wherein the main control switch 126 is shown with the circuit open between the arms 126ᴬ and 126ᶜ and closed between the arms 126ᴬ and 126ᴮ to thus energize the locking relay armature 133. Although the resetting switch arm 143 has closed the solenoid switch 149, the solenoid is not energized because the solenoid circuit is open between the main control switch arms 126ᴬ and 126ᶜ, hence the driven shaft 70 and its operating elements are in the condition shown in Fig. 4, with the film 23, its drive mechanism and the shutter all in stationary or inoperative position.

When the minute-hand gear 112 (or disc wheel 127) has moved to operative position wherein one of the pins 125 has engaged and moved the arm 126ᴬ, of the main control switch 126, into operative position to close the circuit between the arms 126ᴬ and 126ᶜ, the solenoid circuit will thus be closed and will be retained closed until the arm 126ᴬ has been released from its engaged position by the pin 125 to move into normal position to close the circuit between arms 126ᴬ and 126ᴮ.

When the solenoid circuit is closed by the pin 125, as above stated, the solenoid 100 will be energized, the plunger 98 will be retracted into the solenoid and thus release its contact with the cam 74ᶜ to release the spring-pressed cam disc 74ᴰ and thereby move the clutch elements 74 and 73 into operative position to cause the rotation of the driven shaft 70.

Shortly after the shaft 70 has been placed into rotation by the plunger-released movement of the cam disc 74ᴰ, the solenoid 100 will become deenergized by the closing of the resetting switch 144, through the upward movement of the arm 102 secured to the solenoid plunger 98, to thereby cause energization of the electromagnet 138 and the opening of the circuit through switch 149. Although the solenoid is therefore energized a very short time, its release of the cam 74ᶜ, during its brief period of energization, will of course permit the clutch elements 74 and 73 to move into operative position to cause a rotation of the shaft 70 for a complete cycle of operation until the cam 74ᶜ again engages the plunger 98 of the deenergized solenoid whereupon the rotation of the drive shaft 70 will be stopped until the solenoid is again energized by the closing of the circuit between the arms 126ᴬ and 126ᶜ by the succeeding minute-hand gear pin 125 after the interim closing of the resetting relay circuit which occurs when the switch arm 102 closes the resetting relay switch 144.

During the single rotation of the shaft 70, the film is first moved the length of one exposure and arrested.

During the movement of the film, by the film-driving sprocket 71 through the Geneva movement and gears 95 and 96, the shutter 72 is also simultaneously progressively rotated, but the exposure opening of the shutter does not enter its phase of operative movement to permit an exposure of the film until the film has been arrested and is in stationary position.

This sequence of film and shutter movements is attained through the Geneva movement and the arrangement in the shutter-operating gear train consisting of the gears 77, 80 and 82.

The apparatus is adapted to make photographic film exposures at irregularly spaced periods of time by simply arranging the spacing of the actuator pins 125 accordingly. As for example, five pins 125 might be adjacently mounted in the minute-hand gear 112 to provide five succeeding exposures taken one every minute, the next following pin 125 could then be spaced for an exposure to be made in 7 minutes or 13 minutes thereafter and other pins 125 spaced for exposures at varying periods of time within the hourly rotation of the gear 112.

The modified clock-actuated electric control means illustrated in Figs. 11 to 16 inclusive is similar in basic operation to that above-described and illustrated in Figs. 8, 9 and 10, however, the modified form of my invention shown in Figs. 11 to 16 inclusive includes additional novel features, compactness of design, increased range of operation, and flexibility for adaptation to various applications and uses.

Referring particularly to Figs. 11 to 14 inclusive my improved electric control means comprises any suitable clock mechanism such as the electric clock 110 which is provided with telescoped pivot members 155A, 156A and 157A rotating with regularity of movement imparted by the clock mechanism; the pivot member 155A being representative of a clock hour-hand and making one revolution every twelve hours; the pivot member 156A being representative of a clock minute-hand and making one revolution every hour; and the pivot member 157A representing a clock second-hand making one revolution every minute.

A second-hand disc 157 is rigidly secured to the pivot shaft 157A and this second-hand disc therefore makes one complete revolution every minute.

A minute-hand disc 156 is rigidly secured to the tubular pivot 156A and makes one complete revolution every hour.

An hour-hand disc 155 is rigidly secured to the tubular pivot 155A and makes one complete revolution every twelve hours.

Suitable spacing and securing collars 158 may be positioned on the pivot members between the discs.

The disc members 155, 156 and 157 are preferably made from insulating material such as Bakelite or other plastic material and are each provided with a plurality of transversely disposed perforations 159 arranged circularly of each disc and adapted to receive therein switch-operating pins.

Figure 12:
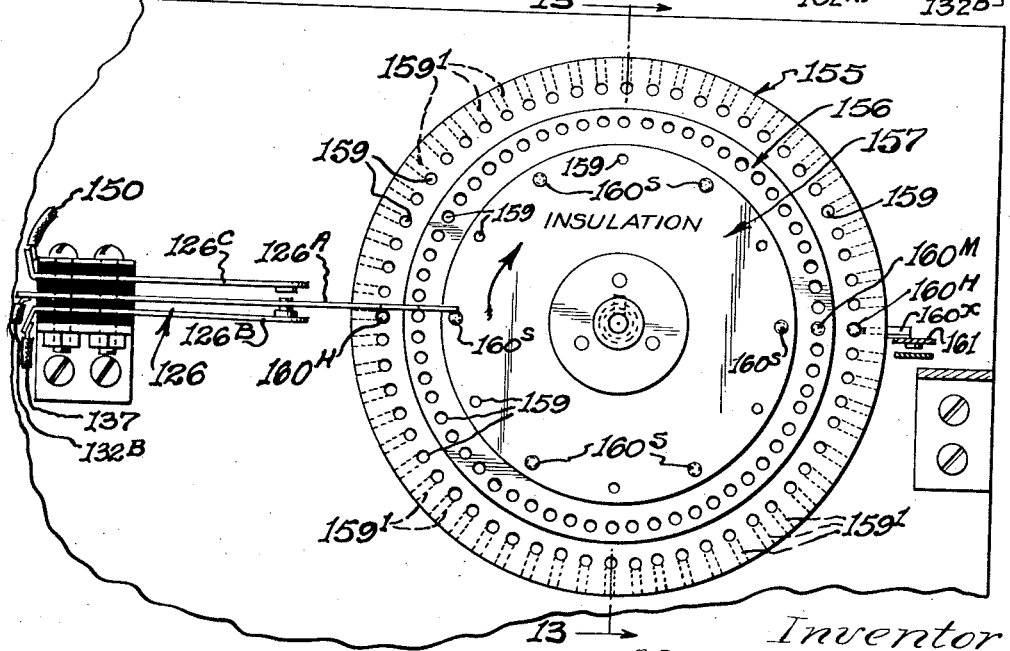
Fig. 12 is a front view of the clock-actuated electric control means shown in Fig. 11 taken on line 12—12 of Fig. 11 showing the master switch in cross-section.

As preferably shown for illustrative purposes in Fig. 12, the hour-hand disc 155 is provided with sixty equally spaced circularly arranged perforations 159 and since this disc makes one revolution each twelve hours, these perforations 159 in disc 155 are spaced apart twelve minutes of time; the minute-hand disc 156 is provided with sixty equally spaced circularly arranged perforations 159 and since this disc makes one revolution every hour, these perforations 159 in disc 156 are spaced apart one minute of time; and the second-hand disc 157 is provided with twelve equally spaced circularly arranged perforations 159 and since this disc makes one revolution every minute, these perforations 159 in disc 157 are spaced apart five seconds of time.

It may now be assumed that the control means is adapted to actuate two switches, such as for example the circuit control or operating switch 126 and a master switch designated by numeral 161; the operating control switch 126 controlling the periodic operations of a machine, device, apparatus or process, and the master switch 161 controlling the operative and inoperative conditions of the control circuit of which the operating switch 126 is a part.

Figure 11:
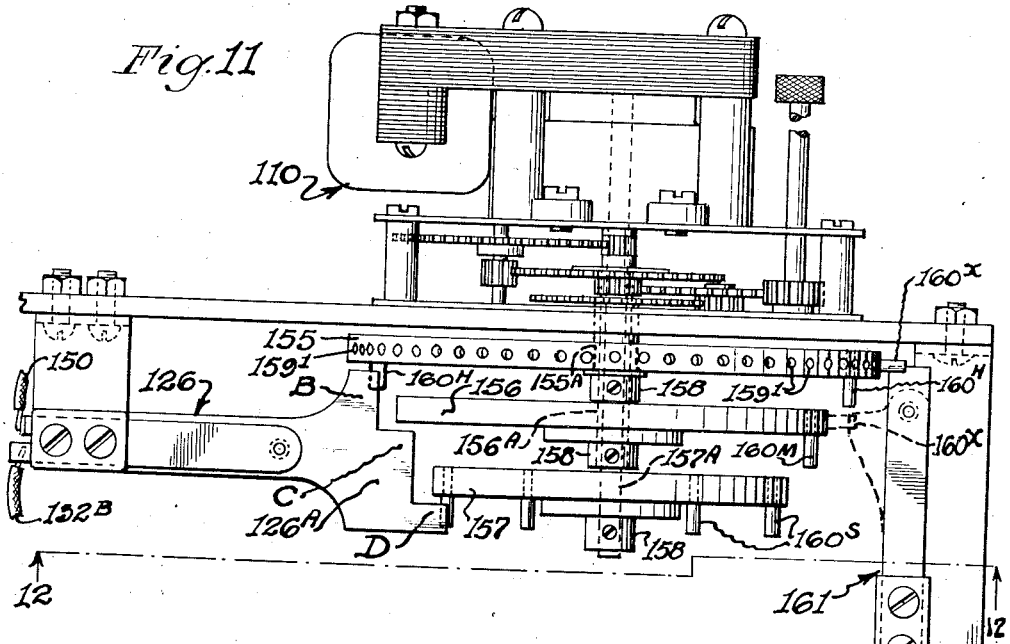
Fig. 11 is a plan view of modified clock-actuated electric control means.

The operating switch 126 is formed with a contact arm 126A which is formed with three relatively laterally offset portions B, C and D as more clearly shown in Fig. 11.

The hour-hand disc 155 is shown in Fig. 12 with two circularly equally spaced switch-operating pins 160H inserted in diametrically opposite perforations 159. During the rotation of the hour-hand disc 155 the pins 160H engage the contact arm portion B and lift the arm 126A to close the circuit between the arms 126A and 126C and with only two pins 160H inserted in the disc 155 the switch 126 will therefore close the circuit once every six hours provided no operating pins are inserted in discs 156 and 157.

As shown in Fig. 12, the minute-hand disc 156 has inserted in it only one switch-operating pin 160M which is adapted to engage the arm portion C and lift the arm 126A to close the circuit between the arms 126A and 126C and with only one pin 160M inserted in the disc 156 the switch 126 will therefore close the circuit once every hour provided no operating pins are inserted in discs 155 and 157.

The second-hand disc 157 is shown in Fig. 12 with six circularly equally spaced switch-operating pins 160S inserted in alternate perforations 159 and these pins 160S are adapted to engage the arm portion D and lift the arm 126A to close the circuit between the arms 126A and 126C once every ten seconds provided no operating pins are inserted in discs 155 and 156.

From the above examples of the actuation of the switch 126 by either of the discs 155, 156 or 157 it will be readily apparent a circuit may be closed, or opened, through the switch 126 at selectively variable, regular or irregular periods of time through the insertion of one or more switch-operating pins in either one, or two, or all three of the discs 155, 156 and 157.

As above indicated any operating circuit may be, and usually is, provided with a master switch, as for example the switch shown and designated by numeral 161 and the clock-actuated control includes means for automatically periodically closing and opening the master switch 161 at selectively variable, regularly or irregularly, spaced periods of time and such means consists in providing one or more of the discs, preferably the hour-hand disc 155, or the minute-hand disc 156, with a plurality of equally spaced holes 159¹ drilled radially into the peripheral side of the disc and adapted to receive therein one or more switch-operating pins 160x which project radially outwardly from the periphery of the disc to engage and actuate the switch 161.

As shown in Figs. 11 and 12, the hour-hand disc 155 is provided with one of such switch-operating pins 160x and by provision of only one of such pins 160x the switch 161 will therefore be actuated to closed circuit position once every twelve hours. If the circuit shown in Fig. 10 were modified as shown in Fig. 15 to provide a time-controlled master switch 161 instead of a manually operable master switch as shown in Fig. 10, the photographic apparatus would be automatically operative for a twelve hour time period and inoperative for twelve hours. During the inoperative period the motor 57 and the mechanism driven thereby would be inoperative however the clock 110 would continue its operation.

In Fig. 15, the motor 57 employed in the operation of the mechanism for the photographic apparatus is shown interposed between the source of current conductors 132A and 132B, however, the flow of the current through the conductor 132A is adapted to be periodically interrupted by a step switch comprising a plurality of contacts 168 adapted to be engaged by a switch arm 167 of electrically conductive material operatively connected to but insulated from a ratchet wheel 166 which is periodically successively partially rotatable by a pawl 165 mounted on a pivoted armature 164 of an electromagnet 163 adapted to be periodically energized by the closing of the circuit through the master switch 161. The operation is such that each successive energization of the electromagnet moves the switch arm 167 alternately into engagement with a contact 168 and then into a position between two of the contacts 168.

In Fig. 15 I show the adaptation of my improved control to the circuit shown in Fig. 10, The entire control illustrated in Figs. 11 to 14 inclusive is shown diagrammatically in Fig. 15 and is designated by numeral 162. The master switch 161 is interposed between the current conductors 132^A and 132^B and by actuation of the pin 160^x is adapted to energize the electromagnet 163 to thereby attract and move its armature 164 and cause the pawl 165 to partially rotate the ratchet 116 a sufficient number of degrees to cause a like partial rotation of a step-switch arm 167 from one of its contacts 168 to a position between two adjacent contacts 168 to thus break the circuit through the conductor 132^A to stop the motor 57 and render the entire circuit inoperative by the control 162 until the master switch 161 is again moved by the control 162 to energize the electromagnet 163 and thus move arm 167 into contact with the succeeding contact 168 whereupon the entire circuit will be reestablished into operative condition.

In Fig. 16 I show, for illustrative purposes, an adaptation of my improved clock-actuated electric control for automatically operating an alarm system including an electrically operated bell 169 and an electric light bulb 170. The bell 169 and light bulb 170 are adapted to be periodically energized when the circuit is closed through the switch 126$^1$, which is actuable by the control 162, as well as through the step switch arm 167 and one of the contacts 168.

While I have illustrated and described the adaptation of my improved clock-actuated electric control means to automatically operable photographic apparatus and to an alarm system, my invention is, as herein-above set forth, not limited to such illustrated uses, since the mechanism shown for moving the film strip may readily be adapted to moving any other strip of material through heating ovens or chemical processing vats. For example, the mechanism and control may move adjacent strips of Celluloid or other plastic material and paper through a pair of opposed rolls positioned in a heated chamber whereby such strips of material are simultaneously heated and by pressure of the rolls slightly compressed and bound together to form a laminated strip of several different materials.

It is obvious that the illustrated mechanism and control could readily be adapted to periodically move the photographic film strip through a film developing solution, or after such film has been developed, fixed and dried, such illustrated mechanism and control could readily be adapted to automatically periodically move the photographic film through electrically lighted printing apparatus for making a continuous strip of positive photographic prints therefrom.

It is obvious that various changes and modifications in the construction and arrangement of the various parts, members and elements may readily be made by those skilled in the art to which my invention relates upon perusal of the attached drawings and the above specifications, hence I do not wish to be understood as limiting myself to the particular construction and arrangement shown herein for purposes of illustrating my invention which is particularly defined in the appended claims.

I claim:

1. In clock-actuated electric control means for apparatus adapted for periodically moving a strip of material, the combination of motor-driven mechanism adapted for periodically moving the strip, and electrical control means for controlling the periodic operation of said motor-driven mechanism including selectively adjustable clock-actuated means for automatically actuating said electrical control means at selectively variable predetermined periods of time.

2. In clock-actuated electric control means as set forth in claim 1, said motor-driven mechanism including solenoid-operated switch and cam-actuated clutch means time-controlled by said clock-actuated means and actuated by said electrical control means at selectively predetermined intervals of time.

3. Clock-actuated control means for an electric circuit including a single switch for said circuit, a clock mechanism, a plurality of concentrically mounted rotatable discs driven by said clock mechanism at relatively different speeds, said discs each having a plurality of circularly spaced openings therein, and at least one pin removably inserted in said openings of either one or more of said discs, said pin or pins being adapted to actuate said switch to periodically, at predetermined intervals of time, change the operative condition of said circuit.

4. Clock-actuated control means for an electric circuit including electrically operable means operatively controlled by said circuit and a switch in said circuit controlling the energization of said electrically operable means, said control means including a clock mechanism, telescoped members driven by said clock mechanism at relatively different speeds, a rotatable disc secured to each telescoped member, said discs being rotatable at relatively different speeds and being concentrically mounted on said telescoped members and each of said discs having a plurality of circularly equally spaced openings therein, adapted to receive switch-operating pins removably inserted in said openings of one or more or all of said rotatable discs to actuate said switch to periodically, at predetermined intervals of time, control the energization of said electrically operable means.

5. In clock-actuated control means as set forth in claim 4, said openings being disposed transversely of said discs, and including at least one of said discs having additional circularly spaced openings disposed radially thereof, an additional master switch for said circuit, an electromagnetically operable step switch in said circuit for alternately controlling the energization and deenergization of said circuit, and one or more switch-operating pins in said radially disposed openings in at least one of said discs whereby said master switch is actuable to actuate said step switch to alternately energize and deenergize said circuit at predetermined intervals of time, said control means being inoperative to energize said electrically operable means when the circuit is open through said step switch.

HERMAN J. FOWLER.

REFERENCES CITED

The following references are of record in the file of this patent:

UNITED STATES PATENTS

| Number | Name | Date |
|---|---|---|
| 1,796,906 | Zimmer | Mar. 17, 1931 |
| 2,290,626 | Bosomworth | July 21, 1942 |
| 2,069,876 | Dorsett | Feb. 19, 1937 |
| 1,865,604 | Yarnall | July 5, 1932 |
| 2,254,795 | Daniels | Sept. 2, 1941 |
| 2,318,969 | Reynolds | May 11, 1943 |
| 349,605 | Reams | Sept. 21, 1886 |
| 843,621 | McIntire | Feb. 12, 1907 |